Patented Apr. 8, 1930

1,754,207

UNITED STATES PATENT OFFICE

LINN BRADLEY, OF MONTCLAIR, NEW JERSEY, AND EDWARD P. McKEEFE, OF NEW YORK, N. Y., ASSIGNORS TO BRADLEY-McKEEFE CORPORATION, OF NEW YORK, N. Y., A CORPORATION OF NEW YORK

TREATMENT OF RESIDUAL LIQUORS

No Drawing. Application filed March 2, 1921, Serial No. 449,243. Renewed June 26, 1928.

This invention relates to the treatment of the residual liquors from alkaline processes for treating cellulose-bearing materials as they come from the digesters and commonly known as black liquor, for the recovery therefrom of valuable products.

In the usual soda pulp process, the chipped wood is subjected to digestion with caustic soda liquor of a strength of about 10.5° to 11.5° Bé., and containing about 92% of the soda as caustic soda (the remainder being mostly sodium carbonate). About 900 gallons of the caustic soda solution are used per cord of wood (measured before chipping), and the digester is heated by direct steam at a pressure which varies from about 90 to 140 pounds, and for a suitable period of time, for example, from 3½ to 5 hours. The liquor is circulated within the digester usually by the steam during the digestion or cooking. The strength of the liquor and the time of treatment will vary somewhat according to the kind, quality and condition of the wood treated. The caustic soda solution used in the cooking operation is commonly made from soda ash by causticizing a solution thereof with lime. The digester is "blown" at the end of the cook and the pulp is separated from the black liquor and is washed with water. The black liquor separated from the pulp is commonly mixed with a certain amount of the wash water and the mixture constitutes what is commonly referred to as black liquor.

During the digestion in the soda pulp process a very considerable amount of wood is dissolved so that the black liquor contains a considerable amount of organic matter in solution, as well as other products produced during the digestion, and various sodium compounds. The black liquor thus commonly carries about 11 to 11½ grams of solids per 100 cc., and the total soda in the liquor is equal to about 5.75 per cent of sodium carbonate, this determination being made by permitting 100 cc. of the liquor to dry and igniting the residue, burning off the organic matter and leaving the sodium carbonate behind.

The common method of treating the black liquor has been to evaporate a part of the water in evaporators and then feed the concentrated black liquor into an incinerator, the common type being a rotary furnace. The black liquor is further concentrated in the rotary furnace and finally burned, the organic matter being decomposed, and the inorganic matter being concentrated in the black ash, particularly in the form of sodium carbonate. The black ash is then treated with water to dissolve the sodium compound away from the insoluble residue of carbon, etc., and the resulting solution, after suitable clarification, and after the addition of a further amount of soda ash, to make up for losses which are usual in the present process (amounting to as much as 15%), is causticized with lime. The soda is thus converted, as far as practicable, into sodium hydroxide or caustic soda. The lime mud is allowed to settle and the clarified solution of caustic soda together with wash water is drawn off to be used again in the digester. The lime mud is wasted, after washing, together with a small percentage of sodium compounds. The organic constituents of the black liquor are consumed or carbonized in the rotary furnace. The only constituents of the black liquor which are commonly recovered are the sodium compounds (principally as sodium carbonate), the organic constituents of the liquor being lost, together with a part of the sodium compounds.

The presence of acetates, etc., in the black liquor has been reported, but so far as we have been able to ascertain no practical method for their recovery has been proposed.

According to the present invention, valuable constituents, other than the soda, may be recovered, while the soda is also recovered for reuse or as merchantable compounds of soda, or in part as merchantable compounds and in part for reuse in the soda pulp process. So also, in the preferred embodiments of the invention, additional amounts of caustic soda or other merchantable products are produced from the sodium of the sodium acid sulfate used as a reagent in the process.

The black liquors which are treated, according to the present invention, are such as are produced in the soda pulp process above described, although other black liquors of similar composition and properties can also be treated. These black liquors generally contain some uncombined sodium hydroxide, together with sodium carbonate and compounds of sodium and organic materials, and also some fermentable sugars. The liquors may also contain other inorganic sodium compounds.

In treating the black liquor, according to the present invention, we add thereto, preferably while still hot from the digester, a reagent or reagents containing the sulfate radical and which are capable of combining with the free sodium hydroxide and of decomposing certain of the sodium organic compounds and combining with the sodium thereof to form sodium sulfate, so that a large part of the precipitable organic matter of the black liquor is precipitated from solution, and so that the reactive soda of the solution is practically all converted into sodium sulfate which remains in solution. The reagents or reagent which may thus be used include sulfuric acid, acid sodium sulfate, ammonium sulfate, etc. If sulfuric acid is used, it will neutralize the free caustic soda to form sodium sulfate and will decompose the greater part of the sodium organic compounds with production of sodium sulfate and precipitation of most of the precipitable organic matter. It will also decompose any sodium carbonate in the liquor and form sodium sulfate. If acid sodium sulfate or nitre-cake is used as the reagent, it will act in much the same way as sulfuric acid, until the acidity of the sodium acid sulfate is neutralized, but in this case the sodium acid sulfate will increase the amount of sodium sulfate present in the black liquor at the end of the treatment of the liquor therewith. If ammonium sulfate is used as the reagent, the ammonia will be set free and can be volatilized and recovered, while the sulfate radical will combine with the reactive sodium of the liquor to form sodium sulfate. We regard the treatment of the black liquor with acid sodium sulfate or nitre-cake (the acid sodium sulfate remaining after the treatment of sodium nitrate with sulfuric acid for the production of nitric acid) as particularly advantageous, for the reason that the acidity of the acid sodium sulfate is utilized in the treatment of the black liquor and the sodium of the acid sodium sulfate gives an additional amount of sodium sulfate in the liquor from which, by subsequent treatment in the manner hereinafter described, a correspondingly increased amount of caustic soda or other soda products can be produced. Instead of adding acid sodium sulfate, a mixture of sulfuric acid and sodium sulfate, in suitable proportions, can be similarly used, and with similar advantages.

As the result of the treatment of the black liquor in the manner described, the precipitable organic matter is, for the most part, precipitated, while the sodium of the black liquor, for the most part, may be converted into sodium sulfate which remains in solution together with any sodium sulfate introduced in the form of acid sodium sulfate. The alkalinity of the liquor is thus neutralized and a solution of sodium sulfate produced from which most of the precipitable organic matter has been precipitated. The solution will also contain such sodium salts as are not decomposed and converted into sodium sulfate, for example, sodium acetate, sodium formate, etc.

The organic matter thus precipitated from the liquor may be removed by sedimentation, filtration, screening or other suitable means, and forms one of the valuable products of the process. This precipitated organic matter, after separation from the liquor, can be washed to remove adhering or admixed sodium salts and mother liquor, and the wash water mixed with the liquor from which the organic matter has been precipitated. The organic matter can be dried and used for various purposes, or it can be subjected to destructive distillation, giving valuable gaseous and liquid products, and a residue of high grade wood charcoal, practically ash-free.

The liquor from which the precipitated organic matter has been separated will contain practically all of the soda in the form of sodium sulfate, together with such salts as sodium acetate, sodium formate, etc., which in some cases are not converted into sodium sulfate. The liquor may be alkaline or neutral in reaction, in case an excess of the acid or acid sodium sulfate is not added, or it may have an acid reaction in case an excess of the acid or acid salt has been added thereto.

Owing to the removal of much of the organic matter from the black liquor, this liquor can be more readily concentrated without objectionable foaming and the evaporation can be carried to a much further degree than the black liquor which is commonly evaporated and which contains all of its organic matter. The evaporation of the solution can thus be carried to such a degree as will correspond to the strength of the solution used originally in the digester; or the solution can be still further concentrated to give a more concentrated caustic solution.

When a concentrated solution of sodium sulfate has been thus obtained, this solution may be then treated for the production of caustic soda therefrom so that a concentrated solution of caustic soda will be produced.

The solution of sodium sulfate is not advantageously causticizible with lime, but this solution can nevertheless be used, according to the present invention, for the production of caustic soda therefrom. In treating this solution, we add thereto a calcium compound, the acid radical of which forms a sodium salt causticizible with lime, and we also add a sufficient excess of acid, in case a sufficient excess is not already present in the liquor, to bring about reaction of the sodium sulfate in solution with the calcium compound, with the resulting production of a causticizible sodium salt in solution and the precipitation of calcium sulfate in the form of gypsum. The calcium compounds which we may thus use include precipitated calcium phosphate (either tricalcium phosphate or the dicalcium phosphate), calcium fluoride, calcium sulfite, etc. For example, if dicalcium phosphate is added to the liquor, it will react with the sodium sulfate, in the presence of a sufficient excess of free acid (either sulfuric or phosphoric) to give a solution of disodium phosphate together with some free acid or monosodium phosphate, and a precipitate of gypsum. If tricalcium phosphate is added as the insoluble calcium compounds, sufficient acid should be used to convert it into dicalcium phosphate and to give the necessary excess of acid to bring about reaction of the dicalcium phosphate with the sodium sulfate to produce disodium phosphate and some monosodium phosphate and gypsum. If an excess of the calcium phosphate is used, some monosodium phosphate may also be formed. If calcium fluoride or calcium sulfite its added to the sodium sulfate solution, only a small excess of free acid, e. g., of sulfuric acid or sulfurous acid or sulfur dioxide, will be necessary to bring about the reaction thereof with the sodium sulfate, to give a precipitate of gypsum (calcium sulfate) and a solution of sodium fluoride or sodium sulfite. In the presence of an excess of acid, the insoluble calcium compounds added to the liquor are sufficiently soluble to undergo reaction, while the calcium sulfate or gypsum produced is substantially insoluble in the dilute acid liquor.

The gypsum which is produced as a precipitate can be removed by filtration or otherwise and forms one of the valuable products of the process. When the gypsum is thus precipitated in the liquor, it may be somewhat off-color, particularly if the liquor still contains any appreciable amount of organic matter. If desired, this gypsum can be freed from any such objectionable color by treatment with alkali to dissolve out the alkali soluble organic matter, thus giving a practically pure or white gypsum.

The solution of causticizible sodium salt produced as above described (e. g., the solution of sodium phosphate, sodium fluoride or sodium sulfite) may be then causticized by treatment with lime, this reaction resulting in the formation of caustic soda in solution and the precipitation of an insoluble calcium compound (e. g., the phosphate, fluoride or sulfite) which is available for reuse. The insoluble calcium compound thus supplies the acid radical which can be alternately and repeatedly reused, first, to form the causticizible sodium salt in solution, by reaction of the sodium sulfate with the precipitated calcium salt in the presence of an acid, and, second, for the production of a further amount of the insoluble calcium salt during the causticizing operation. The calcium of the lime used for the causticizing is removed finally from the process as calcium sulfate or gypsum. The original materials treated and used are, therefore, the black liquor and the reagent (containing the sulfate radical) added thereto, and lime, while the products of the process are the precipitated organic matter (and products derived therefrom), the caustic soda or other soda products in solution, and gypsum; together with acetic acid, etc., which can be recovered as hereinafter described.

It will thus be seen that the insoluble product removed from the process is gypsum. Gypsum can be readily washed so that there is no appreciable loss of alkali compounds therewith. Such alkali compounds as may remain admixed with the precipitated calcium compound that is returned to the process will not be lost, but will be returned to the process therewith. When such calcium precipitate (e. g., the phosphate, fluoride or sulfite) is thus returned to the process, therefore, it is not necessary to wash it to free it from accompanying alkali compounds. The present invention can therefore be carried out with a decreased loss of alkali as compared with present methods of recovery of caustic soda from black liquor, according to which the black liquor is concentrated, calcined, the calcine leached, and the leach liquor causticized. Some loss of alkali compounds takes place with the leached residue, and also with the calcium carbonate sludge resulting from the causticizing. In the process of the present invention the gypsum is the only compound that requires washing to remove alkali compounds, and it can be much more readily washed than the calcium carbonate sludge above mentioned.

The caustic soda solution produced as above described, if of suitable concentration, can be directly returned to the digester for reuse in the soda pulp process. If it is not of sufficient concentration, it can be further concentrated before reuse. If sulfuric acid or ammonium sulfate were used for treating the black liquor and precipitating the precipitable organic matter therefrom, the amount of caustic soda produced may be insufficient for reuse, and further amounts of caustic soda can be added thereto, or sufficient soda ash or other causticizible sodium salt before causticizing, to make up for losses, before the solution is returned for reuse in the digester. If a mixture of sodium sulfate and sulfuric acid, or sodium acid sulfate, is used for treating the black liquor, a correspondingly increased amount of caustic soda can be produced.

Instead of first concentrating the liquor containing the sodium sulfate, after the separation of the precipitated organic matter, and then treating the liquid for the production of caustic soda, we may first treat the unconcentrated liquor, after the removal of the precipitated organic matter therefrom, and produce a correspondingly dilute solution of caustic soda, and subsequently concentrate the caustic soda solution thus produced, although we regard the causticizing after concentration as more advantageous and as ordinarily to be recommended.

When nitre-cake or acid sodium sulfate is used for treating the black liquor, the amount of sodium sulfate in solution in the liquor, after the separation of the precipitated organic matter, may be considerably in excess of that desired for reuse in the soda pulp process. In such cases, instead of treating the entire amount of sodium sulfate for the production of caustic soda therefrom, we may concentrate the solution until the excess sodium sulfate crystallizes out from the solution on cooling. This crystallization of part of the sodium sulfate will bring about a further concentration of the liquor, due to the water removed as water of crystallization. The sodium sulfate solution remaining after the separation of the excess sodium sulfate therefrom, may then be treated for the production of caustic soda in the manner above described, thus giving, as products of the process, a caustic soda solution available for reuse in the digester, and sodium sulfate in a crystalline state.

The sodium sulfate thus separated can be used for the production of merchantable caustic soda by treating it in the same way as the sodium sulfate solution hereinbefore described; that is, by forming a solution of the substantially pure sodium sulfate crystals and treating the solution with a calcium compound the acid radical of which forms a sodium salt causticizible with lime, in the presence of sufficient free acid to bring about the formation of such sodium salt and the precipitation of gypsum, and then treating the resulting solution of causticizible sodium salt with lime to produce the caustic soda solution and to give the calcium salt precipitate for reuse. The caustic soda solution thus produced will be of reasonable purity and can be concentrated to give a concentrated caustic soda solution, or converted into solid caustic.

From one standpoint, the process of the present invention may therefore be considered a process of treating nitre-cake or acid sodium sulfate by neutralizing its acidity with the alkali of the black liquor, thereby producing normal sodium sulfate, and utilizing the sodium sulfate thus produced, in part for the production of a caustic soda solution for reuse in the digester and in part for the production of merchantable caustic soda or other soda products; while substantially the total amount of the sulfate radical of the acid sodium sulfate is recovered as gypsum.

Instead of concentrating the sodium sulfate solution, after the separation of precipitated organic matter, to such an extent that the excess sodium sulfate will be removed by crystallization on cooling, while leaving in the solution enough sodium sulfate for the production of an amount of caustic soda corresponding to that originally used, the entire amount of sodium sulfate in solution can be treated for the production of caustic soda therefrom. A considerable excess of caustic soda over and above that originally used in the digester may thus be produced. This excess may be stored and used in successive operations, thus correspondingly reducing the amount of caustic soda required to be produced for such subsequent operations. In such cases, a part only of the sodium sulfate liquor may be treated for the production of caustic soda therefrom, and the remainder of the sodium sulfate solution may be concentrated to such a degree that practically all of its sodium sulfate content will crystallize out on cooling. That is, instead of concentrating the liquor to remove a part of its sodium sulfate content in a crystalline state, and treating the remainder of the liquor for the production of caustic soda, a part of the liquor may be treated for the production of caustic soda from the entire sodium sulfate content thereof, and the remainder of the liquor treated for the production of crystalline sodium sulfate, which can be separately treated for the production of a caustic soda or other soda products of merchantable quality.

The black liquor from the soda pulp process contains a considerable amount of sodium acetate. We have found that this sodium acetate can be profitably and advantageously recovered from the solution of caustic soda, produced as above described. We have found that if the caustic solution is sufficiently concentrated, the sodium acetate will, to a considerable extent, crystallize out from the concentrated liquor on cooling, and can thus be recovered in a crystalline state. Such amounts of sodium acetate as are not crystallized out will remain in the liquor and will be returned to the digester therewith. If the concentration of the caustic liquor is not carried sufficiently far to cause separation of sodium acetate, it will remain in the liquor and will be returned to the digester.

If the sodium acetate is not produced in sufficient amount during one digestion to make it profitable to recover it from the black liquor, it can be returned with the concentrated and causticized liquor to the digester and permitted to build up in this way, by returning the liquor one or more times, until there is enough sodium acetate in the black liquor produced by the subsequent operation to make it profitable to separate it, or to separate out the excess of the sodium acetate. That is, the sodium acetate can be permitted to remain in the liquor returned to the digester, and the liquor treated for the recovery of sodium acetate only after an accumulation thereof has taken place during two or more digestion operations. The black liquor from one of the subsequent operations, and in which the sodium acetate has accumulated, can thus be freed from organic matter in the manner above described, and the resulting solution, (either with or without preliminary concentration and separation of part of the sodium sulfate therefrom) treated for the conversion of sodium sulfate into caustic soda, and the resulting caustic soda solution concentrated for the separation of more or less of the sodium acetate therefrom on cooling or the acetate may be otherwise utilized. The sodium acetate can thus be recovered either from the original black liquor, produced from each digestion, or from the black liquor produced by subsequent digestions, after the sodium acetate content has been permitted to build up in the liquor. In so far as the sodium acetate undergoes change in the digester, for example, to sodium oxalate or other causticizable soda compound, the treatment of the black liquor with lime will reconvert such compounds into caustic soda which is thus made available in the further carrying out of the soda pulp process.

Instead of recovering the acetic acid from the liquor in the form of sodium acetate, by concentrating the caustic solution in the manner above described, we may recover it in a free state by adding a sufficient amount of sulfuric acid or acid sodium sulfate (either at the time of precipitating organic matter or after the organic matter has been separated, and either before or after concentration of the sodium sulfate solution from which organic matter has been separated) and distilling off the acetic acid and other volatile acids and recovering them by condensation. If the black liquor is acidified or contains a sufficient excess of acid, after the precipitable organic matter has been separated, the acetic and other volatile acids can be distilled off during the concentration of the black liquor and recovered with the condensate,—in this case being diluted with a considerable amount of water. The acetic acid can be obtained in a more concentrated state by first concentrating the liquor, in the absence of an excess of acid, after the removal of the precipitated organic matter, and then acidifying the concentrated liquor and distilling off the acetic acid, etc. These two methods of recovering the acetic acid can be combined, and some of the acetic acid distilled off during concentration, and the rest after concentration and after further acidification. The distillation of acetic acid during the concentration can be prevented by avoiding excess sulfuric acid, or by neutralizing any excess sulfuric acid before concentration, so that the acetic acid will remain in a combined state in the concentrated liquor, from which it can be recovered by acidification and distillation. The concentrated sodium sulfate solution, which may still contain all of its sodium sulfate content, or from which the excess sodium sulfate may have been separated by crystallization, can thus be acidified to set free the acetic acid and other volatile acids, and these acids then distilled off and may be recovered; while the sodium sulfate solution remaining after such treatment can then be treated for the conversion of the sodium sulfate thereof into caustic soda, in the manner above described.

The concentration of the liquor after the precipitation of most of the precipitable organic matter therefrom may bring about a further precipitation or separation of organic matter in a form which can be removed by filtration or otherwise before the concentrated liquor is treated for the production of crystalline sodium sulfate or for the production of caustic soda in solution, thus improving the quality of the sodium sulfate crystallized out and of the caustic solution produced. The liquor can be improved in color, before the crystallization or before the treatment for the production of caustic soda, by subjecting it to a decolorizing operation, for example, by filtration through charcoal, and, for this purpose, the charcoal produced by calcination or destructive distillation of the organic matter precipitated from the black liquor can be used to advantage.

The wood commonly treated by the soda pulp process is poplar; and it is one advantage of the present invention that it enables larger amounts of bass wood and other woods of the same type to be utilized than have heretofore been utilizable to advantage, owing to the excessive soda losses occurring when these woods are used and difficulties due to foaming of the black liquor during concentration. This objectionable foaming and excessive soda loss is largely overcome by the present invention owing to the removal of the precipitable organic matter from the black liquor before concentration. The present invention, therefore, makes possible the treatment of cellulose-bearing materials which could not be treated economically, or which could be treated only with less advantage, according to the common methods of treatment.

While, ordinarily, we regard it as more advantageous to precipitate the precipitable organic matter from the black liquor before its concentration, we may, nevertheless, subject the black liquor to a preliminary concentration, to such a degree as can be carried out without objectionable foaming, before treating the liquor for precipitation of the precipitable organic matter, so that the organic matter will be precipitated from a more concentrated liquor, and so that a more concentrated solution of sodium sulfate will be directly produced. The process, when such preliminary concentration is effected, will otherwise be similar to the process carried out without such preliminary concentration, although the amount of further concentration will be correspondingly reduced, and a lesser amount of a more concentrated liquor will be handled during the precipitation of the organic matter, etc.

While we have described the invention in connection with the treatment of black liquor from the soda pulp process, with particular reference to the process in which caustic soda is employed for the treatment of poplar and other woods, yet the invention is also applicable to the treatment of black liquor produced by the sodium sulfate process, so-called, especially as such liquor also commonly contains notable amounts of soda in the form of caustic soda, sodium organic compounds, causticizible sodium salts, etc., and inasmuch as part of the organic matter can be similarly precipitated from such block liquor in a similar manner to that hereinbefore described. The solution of sodium sulfate remaining after the separation of the precipitated organic matter can be treated in a manner similar to that above described.

It will thus be seen that the present invention involves a novel and advantageous method of treating black liquor, for the recovery of various valuable products therefrom; as well as a method of producing other products, such as gypsum, sodium sulfite, sodium sulfate, or additional caustic soda, from the reagents used in the treatment of the black liquor. When acid sodium sulfate is utilized as the reagent, the black liquor is utilized for neutralizing the acidity of the acid sodium sulfate and combining the reactive sodium of the black liquor therewith, thereby giving an increased amount of sodium sulfate in the treated liquor from which caustic soda can be produced, either in the form of a solution available for reuse in the soda pulp process, or in part for the production of such a solution and in part for the production of crystalline sodium sulfate, sodium sulfite or bisulfite or of merchantable caustic soda therefrom. When ammonium sulfate is utilized for treating the liquor, the alkali of the liquor will be utilized in setting free the ammonia which can be distilled off and recovered, leaving sodium sulfate in solution. It will also be seen that the invention enables valuable organic compounds, such as acetic acid, etc., to be obtained either in the form of the free acids by acidification and distillation or in the form of sodium acetate by sufficiently concentrating and cooling the caustic soda solution.

We claim:—

1. The method of treating residual liquor from an alkaline process of treating cellulose bearing materials, which comprises removing organic material therefrom with a reagent containing the sulfate radical and treating the resulting solution, without calcination, to produce a solution containing caustic alkali.

2. The method of treating residual liquors from alkaline processes of treating cellulose bearing materials, which comprises removing organic matter therefrom by the addition of acid sodium sulfate or a mixture of sodium sulfate and sulfuric acid, and treating the resulting solution of sodium sulfate, without calcination, for the production of a solution containing caustic soda.

3. The method of treating residual liquor from an alkaline process of treating cellulose bearing materials, which comprises removing organic matter therefrom with a reagent containing the sulfate radical, concentrating the resulting solution containing alkali metal sulfate, and treating the concentrated solution, without calcination, for the production of a solution containing caustic alkali available for reuse.

4. The method of treating residual liquors from an alkaline process of treating cellulose bearing materials, which comprises precipitating organic matter therefrom with a reagent containing the sulfate radical, separating and washing the precipitated organic matter, adding the wash water to the liquor from which the organic matter was precipitated, concentrating the resulting solution and treating the solution, without calcination, for the production of a solution containing caustic alkali.

5. The method of treating black liquor without calcination, which comprises removing organic matter therefrom by the addition of acid sodium sulfate or a mixture of sodium sulfate and sulfuric acid, concentrating the resulting solution containing sodium sulfate to remove part of the sodium sulfate by crystallization and treating the remaining sodium sulfate solution for the production of a solution of causticizible sodium compound therefrom.

6. The method of treating black liquor, which comprises removing organic matter therefrom with a reagent containing the sulfate radical, treating the resulting solution containing sodium sulfate, either before or after concentration, with a calcium compound, the acid radical of which forms a sodium salt causticizable with lime, in the presence of sufficient acid to bring about reaction between the sodium sulfate and the calcium compound to give a precipitate of gypsum and a solution of the causticizible sodium salt.

7. The method of treating black liquor, which comprises removing organic matter therefrom with a reagent containing the sulfate radical, concentrating the resulting solution containing sodium sulfate, and treating the concentrated solution without calcination for the production of a solution of caustic soda available for reuse.

8. The method of treating black liquor, which comprises precipitating organic matter therefrom with a reagent containing the sulfate radical, separating and washing the precipitated organic matter, adding the wash water to the liquor from which the organic matter was precipitated, concentrating the resulting solution, and treating the solution without calcination for the production of a solution of caustic soda therefrom.

9. The method of treating black liquor, which comprises removing organic matter therefrom with an acid sodium sulfate, concentrating the resulting solution of sodium sulfate to a sufficient degree to effect separation of part of the sodium sulfate therefrom by crystallization, separating the sodium sulfate thus crystallized, treating the remaining solution of sodium sulfate for the production of a solution of caustic soda for reuse, and separately treating the crystallized sodium sulfate for the production of a causticizible soda compound therefrom.

10. The method of treating black liquor, which comprises removing organic matter therefrom with a reagent containing the sulfate radical, and removing volatile acids from the resulting solution containing sodium sulfate by the addition of sufficient acid to set free the volatile acids and by distillation of the volatile acids.

11. The method of treating black liquor, which comprises removing organic matter therefrom with a reagent containing the sulfate radical, concentrating the resulting solution of sodium sulfate, adding to the concentrated solution a calcium compound, the acid radical of which forms a sodium salt causticizable with lime, in the presence of sufficient acid to bring about reaction of the calcium compound with the sodium sulfate to produce gypsum and a solution of the causticizible sodium salt, and causticizing the resulting solution with lime to give a solution of caustic soda available for reuse.

12. The method of treating black liquor, which comprises removing organic matter therefrom with acid sodium sulfate or a mixture of sulfuric acid and sodium sulfate, treating the resulting solution of sodium sulfate without calcination for the production of a solution of caustic soda therefrom, and regulating the amount of sodium added in the form of sodium sulfate or acid sodium sulfate to make up for losses of soda in the process and to give a solution of caustic soda of amount sufficient for reuse in the digester.

13. The method of producing sodium sulfite in solution, which comprises treating residual liquors from an alkaline process of treating cellulose-bearing materials with a sodium acid sulfate, removing separated organic matter, and treating the solution with sulfur dioxide in the presence of a calcium compound, thereby bringing about a precipitation of gypsum and forming a solution containing sodium sulfite.

14. The method of producing sodium sulfite in solution, which comprises treating residual liquors from an alkaline process of treating cellulose-bearing material with a sodium acid sulfate, removing separated organic matter, and treating the solution, either before or after concentration, with calcium sulfite in the presence of sufficient free acid to bring about reaction with precipitation of gypsum and the production of a solution containing sodium sulfite.

15. The method of preventing objectionable foaming of residual liquor during the concentration thereof, which comprises treating such liquor before concentration with a reagent containing available sulfate radical adapted to precipitate organic matter from the liquor, removing precipitated organic matter and thereafter concentrating the resulting liquor.

16. The method of treating residual liquor from a pulp-making operation which comprises adding thereto a material containing sulfate radical and an oxy-sulphur compound of ammonium.

In testimony whereof we affix our signatures.

LINN BRADLEY.
EDWARD P. McKEEFE.